United States Patent
Oh et al.

(10) Patent No.: US 8,493,680 B2
(45) Date of Patent: Jul. 23, 2013

(54) IC PROTECTION CIRCUIT, METHOD FOR PROTECTING IC, AND APPARATUSES HAVING THE IC PROTECTION CIRCUIT

(75) Inventors: Young-Keun Oh, Suwon-si (KR); Gyu-Sang Lee, Suwon-si (KR); Ki Choel Lee, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 360 days.

(21) Appl. No.: 13/018,459

(22) Filed: Feb. 1, 2011

(65) Prior Publication Data
US 2011/0188146 A1    Aug. 4, 2011

(30) Foreign Application Priority Data
Feb. 4, 2010 (KR) .................. 10-2010-0010276

(51) Int. Cl.
| | |
|---|---|
| *G11B 5/09* | (2006.01) |
| *H02H 9/00* | (2006.01) |
| *H02H 3/20* | (2006.01) |
| *H02H 9/04* | (2006.01) |

(52) U.S. Cl.
USPC .............. 360/46; 361/56; 361/91.1; 361/91.6

(58) Field of Classification Search
None
See application file for complete search history.

(56) References Cited

U.S. PATENT DOCUMENTS

| | | | |
|---|---|---|---|
| 5,986,862 A | 11/1999 | Kim | |
| 6,738,268 B1* | 5/2004 | Sullivan et al. | .................. 363/49 |
| 6,901,520 B2* | 5/2005 | Odaohhara et al. | ........... 713/300 |
| 8,164,876 B2* | 4/2012 | Simi | .............................. 361/117 |
| 2004/0095815 A1* | 5/2004 | Chloupek et al. | ............. 365/200 |

FOREIGN PATENT DOCUMENTS

| | | |
|---|---|---|
| JP | 10-200052 | 7/1998 |
| JP | 2008-263695 | 10/2008 |
| KR | 100249162 | 12/1999 |

* cited by examiner

*Primary Examiner* — Regina N Holder
(74) *Attorney, Agent, or Firm* — Volentine & Whitt, PLLC

(57) ABSTRACT

An electronic device includes a power supply line connected between a DC power supply and an integrated circuit, and a first electronic element and a second electronic element serially connected between the power supply line and ground. The second electronic element is open when the first electronic element is short-circuited due to an overvoltage induced in the power supply line. When the overvoltage exceeds a breakdown voltage of the first electronic element, the first electronic element supplies an overcurrent induced in the power supply line to the second electronic element.

20 Claims, 4 Drawing Sheets

IC PROTECTION CIRCUIT, METHOD FOR PROTECTING IC, AND APPARATUSES HAVING THE IC PROTECTION CIRCUIT

CROSS-REFERENCE TO RELATED APPLICATIONS

This application claims priority under 35 U.S.C. §119(a) from Korean Patent Application No. 10-2010-0010276, filed on Feb. 4, 2010, in the Korean Intellectual Property Office, the disclosure of which is incorporated herein in its entirety by reference.

BACKGROUND

The inventive concept relates to integrated circuit (IC) protection technologies, and more particularly, to an IC protection circuit that may protect an IC from overvoltage or overcurrent, an IC protection method, and apparatuses having the IC protection circuit.

Electronic devices using a DC voltage as an operation voltage, for example, an integrated circuit (IC), includes a protection circuit to protect the electronic device from instantaneous overvoltage or static electricity. The protection circuit is disposed at an input stage of the electronic device and cuts off supply of instantaneous overvoltage or instantaneous overcurrent to the input stage so that a normal DC voltage may be supplied to the input stage. However, when the protection circuit is destroyed by the overvoltage or overcurrent, the protection circuit is not able to provide a normal DC voltage to the input stage of the electronic device so that the electronic device may malfunction or be permanently inoperative.

SUMMARY

The inventive concept provides an IC protection circuit that may safely protect an IC from overvoltage or overcurrent and safely supply a normal operation voltage to the IC, an IC protection method, and apparatuses having the IC protection circuit.

According to an aspect of the inventive concept, there is provided an electronic device includes a power supply line connected between a DC power supply and an integrated circuit, and a first electronic element and a second electronic element connected between the power supply line and ground. The second electronic element is open when the first electronic element is short-circuited due to an overvoltage induced in the power supply line. When the overvoltage exceeds a breakdown voltage of the first electronic element, the first electronic element may supply an overcurrent induced in the power supply line to the second electronic element.

The first electronic element may be a transient voltage suppression (TVS) diode or a zener diode. The second electronic element may be a zero ohm resistor or a fuse. The second electronic element may be open due to an overcurrent supplied through the first electronic element when the first electronic element is short-circuited.

According to another aspect of the inventive concept, there is provided a method of protecting an integrated circuit, which includes supplying a DC voltage output from a DC power supply to the integrated circuit through a power supply line, and allowing the second electronic element to be open by an overcurrent supplied through the first electronic element that is short-circuited when the first electronic element connected to the power supply line is short-circuited due to an overvoltage induced in the power supply line.

In the allowing of the second electronic element to be open, the second electronic element may be open by the overcurrent when the first electronic element is short-circuited as the overvoltage exceeds a breakdown voltage of the first electronic element.

The first electronic element may be a transient voltage suppression (TVS) diode and the second electronic element may be a zero ohm resistor.

According to another aspect of the inventive concept, there is provided a hard disk drive, which includes a magnetic recording medium for storing data, a pre-amplifier for amplifying an analog read signal read from the magnetic recording medium, an integrated circuit for processing a signal amplified by the pre-amplifier, the integrated circuit being operated by a DC voltage, a power supply line for supplying the DC voltage generated by a DC power supply, to the integrated circuit, and a first electronic element and a second electronic element serially connected between the power supply line and ground, wherein the second electronic element is open when the first electronic element is short-circuited due to an overvoltage induced in the power supply line.

When the overvoltage exceeds a breakdown voltage of the first electronic element, the first electronic element may supply an overcurrent induced in the power supply line to the second electronic element, and the second electronic element is open by the overcurrent.

According to another aspect of the inventive concept, there is provided a computer system including the above hard disk drive, and a host for exchanging data with the hard disk drive.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
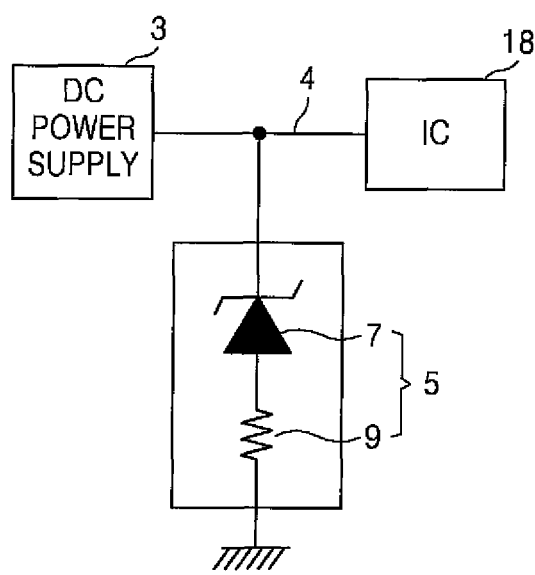
FIG. 1 is a block diagram of an electronic device having an IC protection circuit according to an exemplary embodiment of the present inventive concept.

The attached drawings for illustrating embodiments of the inventive concept are referred to in order to gain a sufficient understanding of the inventive concept and the merits thereof. Hereinafter, the inventive concept will be described in detail by explaining embodiments of the inventive concept with reference to the attached drawings. Like reference numerals in the drawings denote like elements.

FIG. 1 is a block diagram of an electronic device 1 having an integrated circuit (IC) protection circuit 5 according to an exemplary embodiment of the present inventive concept. Referring to FIG. 1, the electronic device 1 may include a DC power supply 3, an IC 18, and the IC protection circuit 5. The electronic device 1 includes a data processing device having an IC or a package with the IC.

The DC power supply 3 supplies a DC voltage, for example, an operation voltage, to the IC 18 through a power supply line 4. Thus, the IC 18 may be operated by the operation voltage.

The IC protection circuit 5 may discharge overvoltage or overcurrent induced in the power supply line 4 to ground so as to safely protect the IC 18 from the overvoltage or overcurrent. The IC protection circuit 5 may include a first electronic element 7 and a second electronic element 9 which are connected between the power supply line 4 and the ground. The first electronic element 7 is destroyed is short-circuited by the overvoltage or overcurrent induced in the power supply line 4. For example, when the overvoltage induced in the power supply line 4 due to static electricity generates a breakdown voltage or an avalanche breakdown voltage of the first electronic element 7, the first electronic element 7 is short-circuited and thus the overcurrent induced in the power supply line 4 is transmitted to the second electronic element 9.

The second electronic element 9 is open by the overcurrent supplied from the first electronic element 7. That is, when the second electronic element 9 is open, the power supply line 4 and the ground are disconnected from each other. Thus, during a normal operation, the operation voltage supplied from the DC power supply 3 is supplied to the IC 18. That is, even when the first electronic element 7 is destroyed, since the second electronic element 9 is open, the IC 18 may receive the operation voltage.

In a certain exemplary embodiment, the first electronic element 7 may be embodied by a transient voltage suppression (TVS) diode or a zener diode. Also, the second electronic element 9 may be embodied by an electronic element, for example, a zero ohm resistor or a fuse, which may be open by the overcurrent supplied from the first electronic element 7.

Figure 2:
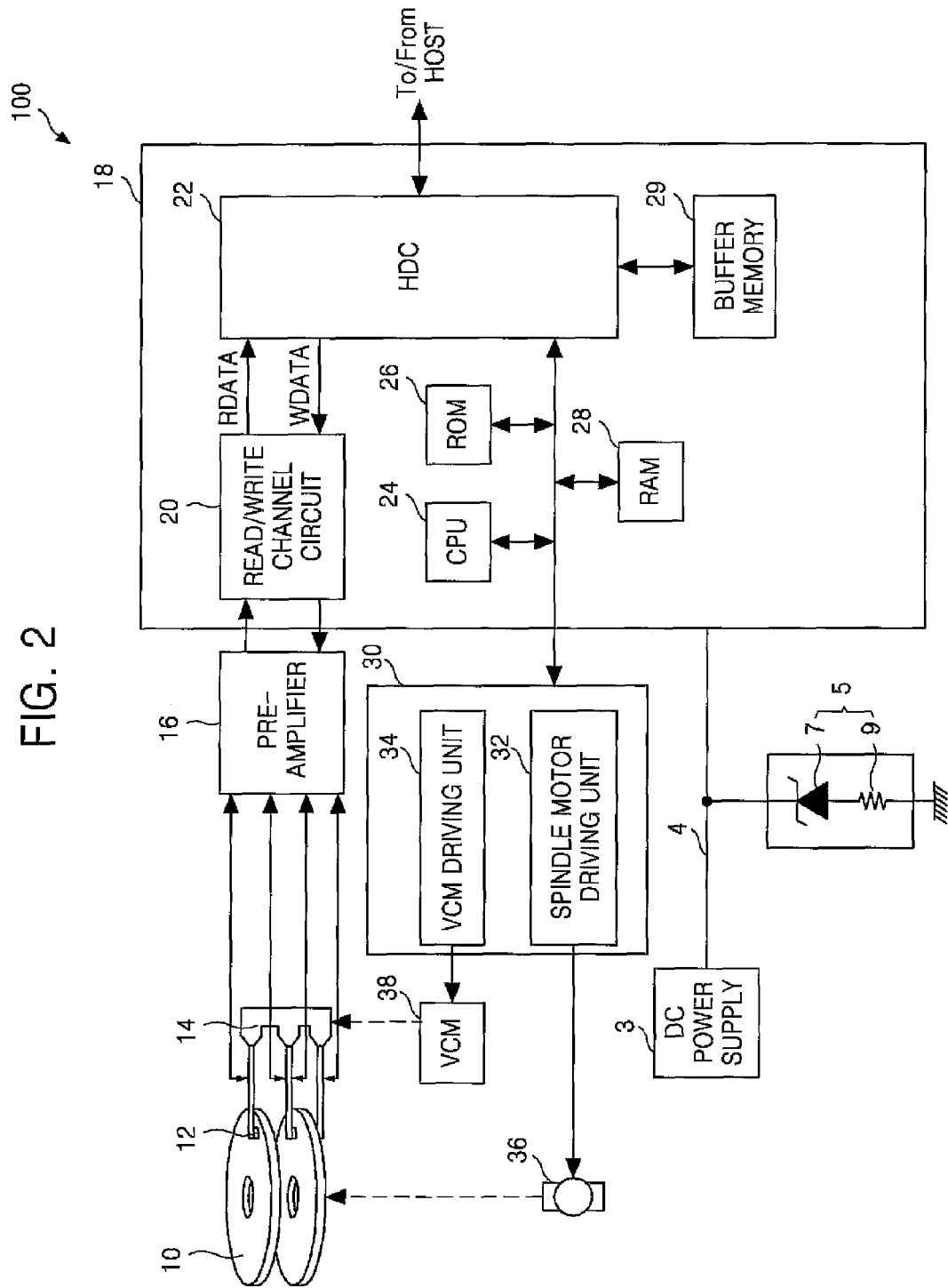
FIG. 2 is a block diagram of a hard disk drive having the IC protection circuit of FIG. 1.

FIG. 2 is a block diagram of a hard disk drive (HDD) 100 having the IC protection circuit 5 of FIG. 1. Referring to FIG. 2, the HDD 100 used as a data storage device may include a plurality of disks 10, a plurality of heads 12, a head assembly 14, a pre-amplifier 16, a main control unit 18, a motor driving unit (or a servo control unit) 30, a spindle motor 36, a voice coil motor (VCM) 38, the DC power supply 3 for supplying a DC voltage, that is, an operation voltage, to the main control unit 18 through a power supply line 4, and the IC protection circuit 5 connected between the power supply line 4 and ground.

The DC power supply 3 may supply the operation voltage through the power supply line 4 to at least one of the pre-amplifier 16, the main control unit 18, and the motor driving unit 30, each of which may be embodied by an IC circuit.

Each of the disks 10 may store data output from a host and be rotated by the spindle motor 36. Each of the disks 10 may be embodied by a magnetic recording medium. Each of the heads 12 is disposed over corresponding one of the disks 10 and performs a read operation or a write operation. Each of the heads 12 is installed at each of a plurality of support arms (not shown) extending from the head assembly 14 coupled to the VCM 38 toward the disks 10.

When data is read from one of the disks 10, the pre-amplifier 16 amplifies an analog signal output by any one of the heads 12 and outputs an amplified analog signal to a read/write channel circuit 20. When data is written to one of the disks 10, the pre-amplifier 16 transmits a write signal, for example, a write current, output from the read/write channel circuit 20 to any one of the head 12. The disk may write the write signal to any one of the disk 10.

The read/write channel circuit 20 converts an analog signal amplified by the pre-amplifier 10 into a digital signal and outputs a converted digital signal to a hard disk controller (HDC) 22. The read/write channel circuit 20 may convert write data output from the HDC 22 into a write signal and output a converted write signal to the pre-amplifier 16.

For example, when data is written to one of the disk 10, the HDC 22 outputs write data output from the host to the pre-amplifier 16, under the control of a central processing unit (CPU) 24. Thus, the write data output from the host may be written to any one of the disks 10 through the read/write channel circuit 20, the pre-amplifier 16, and any one of the heads 12.

Also, when data is read from any one of the disks 10, the HDC 22 may receive read data that is decoded by the read/write channel circuit 20, perform error correction with respect to received read data, and transmit error corrected data to the host, under the control of the CPU 24.

The CPU 24 that is capable of controlling the operation of the main control unit 18 may read a program code stored in a read only memory (ROM) 26, store a read program code in a random access memory (RAM) 28, and execute the program code stored in the RAM 28, thereby controlling the operation or the HDD 100 or the HDC 22.

The CPU 24 may receive a read command or a write command output from the host and control a spindle motor driving unit 32 and a VCM driving unit 34 in order to control track seek or track following according to a received command. The spindle motor driving unit 32 controls the operation of the spindle motor 36 for controlling the rotation of the disks 10 in response to at least one control signal output from the HDC 22.

The VCM driving unit 34 generates a driving current for driving the VCM 38 and outputs a generated driving current to a voice coil (not shown) of the VCM 38, in response to at least one control signal output from the HDC 22, for example, a control signal to control the location of each of the heads 12. The VCM 38 moves a head in use of the head 12 over a track embodied in any one of the disks 10 according to the direction and level of the driving current output from the VCM driving unit 34.

In a certain exemplary embodiment, a buffer memory 29 that may be embodied inside or outside the main control unit 18 may temporarily store data exchanged between the HDD 100 and the host. The buffer memory 29 may be embodied by a volatile memory such as a DRAM.

In a certain exemplary embodiment, the main control unit 18 including the read/write channel circuit 20, the HDC 22, the CPU 24, the ROM 26, the RAM 28, and the buffer memory 29 may be embodied by a single chip, for example, a system-on-chip (SoC). Also, the motor driving unit 30 including the spindle motor driving unit 32 and the VCM driving unit 34 may be embodied by a single chip, for example, a system-on-chip (SoC).

Figure 3:
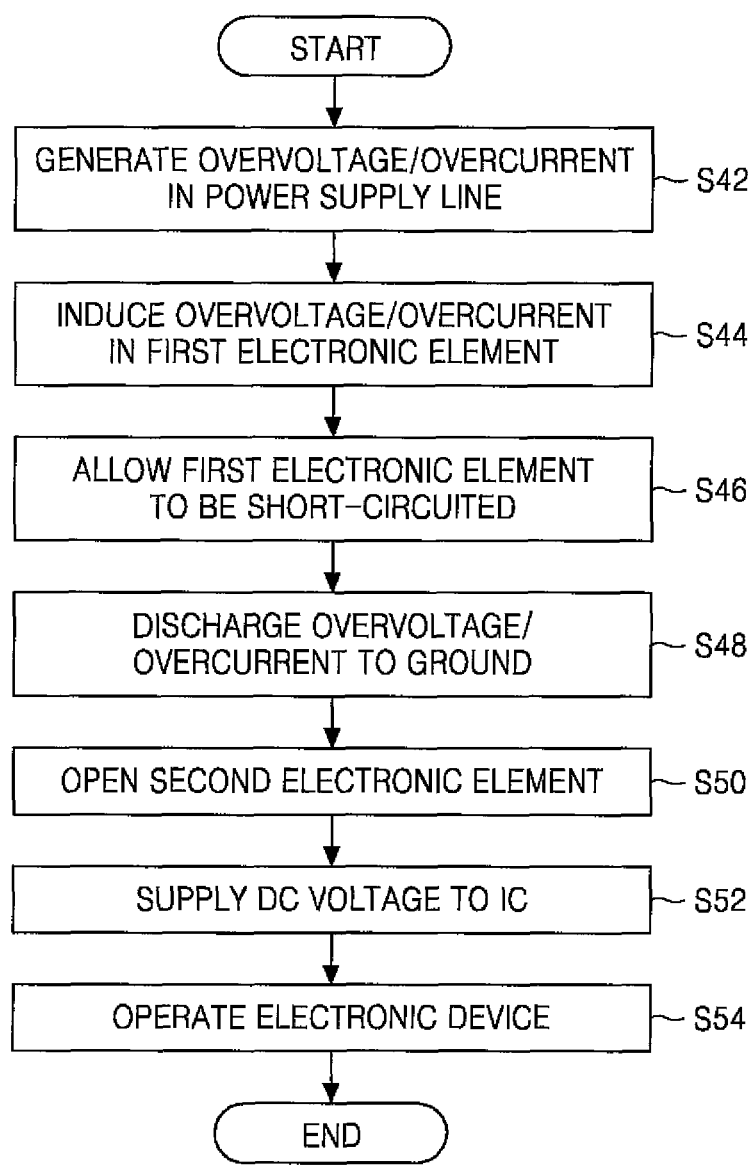
FIG. 3 is a flowchart for explaining the operation of the IC protection circuit of FIG. 1.

FIG. 3 is a flowchart for explaining the operation of the IC protection circuit 5 of FIG. 1. Referring to FIGS. 1-3, an overvoltage is generated in the power supply line 4 due to static electricity (S42). The overvoltage is input to the first electronic element 7, for example, a TVS diode (S44). When the overvoltage exceeds a breakdown voltage of the TVS diode, the TVS diode is destroyed and short-circuited (S46).

Thus, the overcurrent is discharged to the ground through the short-circuited TVS diode and the second electronic element 9, for example, a zero ohm resistor (S48). The zero ohm resistor 9 is destroyed by the overcurrent. As a result, the zero ohm resistor 9 is open (S50). The DC power supply 3 supplies an operation voltage or operation current to the IC 18 via the power supply line 4 (S52). Since the zero ohm resistor 9 is not open, the operation voltage or operation current is not supplied to the ground. Thus, the electronic device 1 or 100 including the IC 18 is normally operated (S54).

Figure 4:
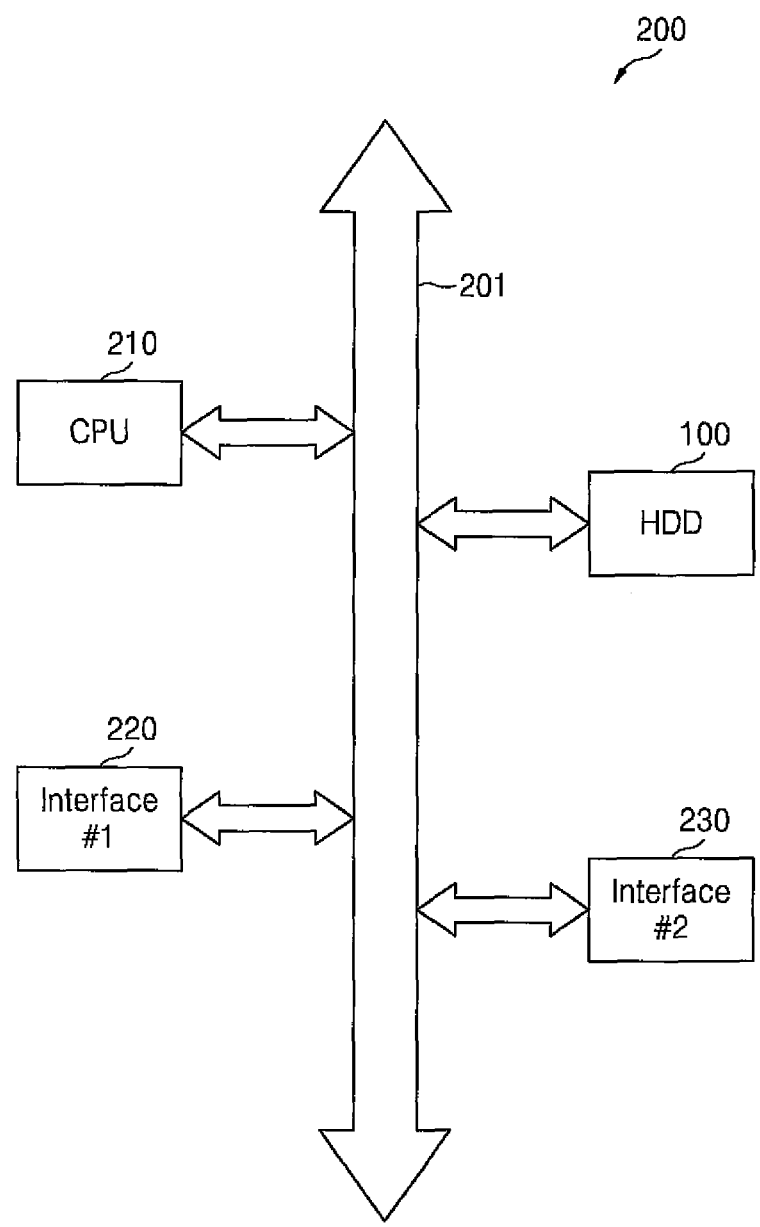
FIG. 4 is a block diagram of a data processing system having the hard disk drive of FIG. 2.

FIG. 4 is a block diagram of a data processing system 200 having the hard disk drive 100 of FIG. 2. Referring to FIGS. 1-4, the data processing system 200 may be embodied by a personal computer (PC), a tablet PC, a portable computer, a handheld communication device, a digital TV, or a home automation device.

The data processing system 200 includes the HDD 100 and the CPU 210 connected to each other via a system bus 201. The HDD 100 and the CPU 210 may perform data communications according to a SATA communications protocol. The CPU 210 may control general operations of the HDD 100, for example, a writing operation or a read operation.

The data processing system 200 may further include a first interface 220. The first interface 220 may be an input/output interface. The input/output interface may be an output device such as a monitor or a printer, or an input device such as a mouse or a keyboard. The data processing system 200 may further include a second interface 230. The second interface 230 may be a wireless communications interface for wireless communications with an external computer system. Thus, the second interface may transmit data stored in the HDD 100 to the external computer system or data transmitted by the external computer system to the HDD 100, under the control of the CPU 210.

When the data processing system 200 is embodied by a hybrid HDD, the data processing system 200 may further include a non-volatile memory device. The CPU 210 may store data in the HDD 100 or the non-volatile memory device according to a data storage policy.

As described above, the IC protection circuit according to the present inventive concept may operate an electronic device safely and normally even if the IC protection circuit itself is destroyed by an overvoltage or overcurrent.

While the inventive concept has been particularly shown and described with reference to exemplary embodiments thereof, it will be understood that various changes in form and details may be made therein without departing from the spirit and scope of the following claims.

What is claimed is:

1. An electronic device comprising:
a power supply line connected between a DC power supply and an integrated circuit, the power supply line being directly connected to the integrated circuit and being configured to supply a DC voltage to the integrated circuit; and
a first electronic element and a second electronic element serially connected between the power supply line and ground in parallel with the integrated circuit,
wherein the second electronic element is open when the first electronic element is short-circuited due to an overvoltage induced in the power supply line.

2. The electronic device of claim 1, wherein, when the overvoltage exceeds a breakdown voltage of the first electronic element, the first electronic element supplies an overcurrent induced in the power supply line to the second electronic element, and the overcurrent causes the second electronic element to be open.

3. The electronic device of claim 1, wherein the first electronic element is a transient voltage suppression (TVS) diode.

4. The electronic device of claim 1, wherein the first electronic element is a zener diode.

5. The electronic device of claim 1, wherein the second electronic element is a zero ohm resistor.

6. The electronic device of claim 1, wherein the second electronic element is a fuse, and wherein, when the overvoltage exceeds a breakdown voltage of the first electronic element, the first electronic element supplies an overcurrent induced in the power supply line to the second electronic element, and the overcurrent causes the fuse to be blown.

7. The electronic device of claim 1, wherein the second electronic element is open due to an overcurrent supplied through the first electronic element when the first electronic element is short-circuited.

8. The electronic device of claim 1, wherein one of the first and second electronic elements is directly connected to ground.

9. A method of protecting an integrated circuit, the method comprising:
supplying a DC voltage output from a DC power supply to the integrated circuit through a power supply line which is directly connected to the integrated circuit;
connecting a protection circuit between the power supply line and ground in parallel with the integrated circuit, the protection circuit having a first electronic element and a second electronic element connected in series with each other;
short-circuiting the first electronic circuit in response to an overvoltage being induced in the power supply line; and
allowing the second electronic element to be open by an overcurrent supplied through the first electronic element when the first electronic element connected to the power supply line is short-circuited due to the overvoltage induced in the power supply line.

10. The method of claim 9, wherein, allowing the second electronic element to be open by the overcurrent comprises the first electronic element being short-circuited as the overvoltage exceeds a breakdown voltage of the first electronic element, and the overcurrent opens the second electronic element.

11. The method of claim 9, wherein the first electronic element is a transient voltage suppression (TVS) diode and the second electronic element is a zero ohm resistor.

12. A hard disk drive comprising:
a magnetic recording medium for storing data;
a pre-amplifier for amplifying an analog read signal read from the magnetic recording medium;
an integrated circuit for processing a signal amplified by the pre-amplifier, the integrated circuit being operated by a DC voltage;
a power supply line for supplying the DC voltage to the integrated circuit; and
a protection circuit connected in parallel with the integrated circuit between the power supply line and ground, wherein the protection circuit comprises a first electronic element and a second electronic element serially connected between the power supply line and ground,
wherein the second electronic element is open when the first electronic element is short-circuited due to an overvoltage induced in the power supply line.

13. The hard disk drive of claim 12, wherein, when the overvoltage exceeds a breakdown voltage of the first electronic element, the first electronic element supplies an overcurrent induced in the power supply line to the second electronic element, and
the overcurrent opens the second electronic element.

14. The hard disk drive of claim 12, wherein the first electronic element is a transient voltage suppression (TVS) diode.

15. The hard disk drive of claim 12, wherein the second electronic element is a zero ohm resistor.

16. A computer system comprising:
the hard disk drive of claim 12; and
a host for exchanging data with the hard disk drive.

17. The computer system of claim 16, wherein, when the overvoltage exceeds a breakdown voltage of the first electronic element, the first electronic element supplies an overcurrent induced in the power supply line to the second electronic element, and the overcurrent opens the second electronic element.

18. The computer system of claim 16, wherein the first electronic element is a transient voltage suppression (TVS) diode.

19. The computer system of claim 16, wherein the second electronic element is a zero ohm resistor.

20. The computer system of claim 16, wherein the first electronic element is a zener diode.

\* \* \* \* \*